United States Patent [19]

Bauer et al.

[11] Patent Number: 5,289,366
[45] Date of Patent: Feb. 22, 1994

[54] METHOD AND APPARATUS FOR CORRECTION OF A DETECTED FAULTY ACTUAL VALVE OF A SIGNAL AFFECTED BY HARMONIC VIBRATIONS

[75] Inventors: Franz Bauer; Michael Braun, both of Herzogenaurach-Niederndorf; Georg Heinle; Hubert Schierling, both of Erlangen, all of Fed. Rep. of Germany

[73] Assignee: Siemens Aktiengesellschaft, Munich, Fed. Rep. of Germany

[21] Appl. No.: 856,211
[22] PCT Filed: Jul. 9, 1990
[86] PCT No.: PCT/EP90/01115
  § 371 Date: Jul. 13, 1992
  § 102(e) Date: Jul. 13, 1992
[87] PCT Pub. No.: WO91/07810
  PCT Pub. Date: May 30, 1991

[30] Foreign Application Priority Data

Nov. 13, 1989 [EP] European Pat. Off. ......... 89121018.9

[51] Int. Cl.$^5$ ............................. G05B 13/04; H02P 5/408
[52] U.S. Cl. ......................................... 364/149; 318/811; 364/176
[58] Field of Search ........................ 364/149–151, 364/148, 152, 176, 177, 183; 318/798, 801, 802, 806, 810, 811, 812; 363/39, 40, 41, 34, 95–97

[56] References Cited

U.S. PATENT DOCUMENTS

| | | | |
|---|---|---|---|
| 3,875,491 | 4/1975 | Abraham | 318/810 X |
| 4,387,421 | 6/1983 | Zach et al. | 364/148 |
| 4,499,413 | 2/1985 | Izosimov et al. | 318/802 |
| 4,623,830 | 11/1986 | Peneder et al. | 318/798 |

Primary Examiner—Joseph Ruggiero
Attorney, Agent, or Firm—Kenyon & Kenyon

[57] ABSTRACT

An actual value ($\bar{u}_{ixRF}$) of a signal ($i_{xRF}$) affected by harmonics may be corrected. A harmonic signal ($u_{iF}$) superimposed on the signal ($i_{xRF}$) is generated using a harmonic-free setting signal ($u_{yR}$), a known pulse pattern ($\alpha_1, \alpha_2, ..., \alpha_5$) stored in the memory of a modulator, and an equivalent model of the control system. The mean value ($\bar{u}_{iF}$) of this harmonic signal ($u_{iF}$) is determined by a second integrating actual value acquisition device. The mean value ($\bar{u}_{iF}$) is subtracted as a correction value from the actual value ($\bar{u}_{ixRF}$), which is affected by errors. In this way, an errorfree actual value ($\bar{u}_{ixR}$) is obtained for a signal ($i_{xRF}$), the harmonics of which are not filtered out in the actual value determination by means of an integrating actual value acquisition device.

15 Claims, 3 Drawing Sheets

METHOD AND APPARATUS FOR CORRECTION OF A DETECTED FAULTY ACTUAL VALVE OF A SIGNAL AFFECTED BY HARMONIC VIBRATIONS

BACKGROUND OF THE INVENTION

The present invention relates to a method for correction of an actual value of a signal affected by harmonics, the actual value determined by means of a first integrating actual value acquisition device, which value is affected by errors, and the signal is generated from a harmonic-free setting signal by means of a modulation function which approximates a harmonic-free setting signal, and a control system.

In electrical drive technology, analog measurement variables, for example converter current, machine voltage, etc., are frequently converted into digital measurement values using integrating measurement value acquisition devices. With the use of an integrating measurement value acquisition device, measurement noise is filtered out and this measurement device can be structured in a very cost-effective manner. A typical structure of an integrating measurement value acquisition device is explained in greater detail in reference to FIG. 3.

Harmonics of a measurement variable are only filtered out, in this connection, if they have the mean value of zero during the measurement interval (gate time). This is brought about, for example, in space vector modulation, by approximation, in that the gate time is made exactly as large as the duration of a switching state sequence, which approximates a reference vector.

If the harmonics of the measurement variable cannot be ignored during the measurement interval (gate time), the actual value determined by means of the integrating measurement value acquisition device is affected by errors. This error is dependent on the mean value of the harmonics from one gate time to the next. The harmonics that impact the measurement variable, and the amplitude at which they impact it, are dependent on the device which excites these harmonics. In a pulse-width-modulated converter with an intermediate voltage circuit, the converter voltage can be controlled by means of precalculated, optimized pulse patterns. This converter voltage, which is affected by harmonics, is passed to an asynchronous machine. The harmonics are excited by the precalculated, optimized pulse patterns. If the torque is now supposed to be regulated in this asynchronous machine, the converter output current has to be acquired. However, since this is affected by harmonics, the actual value of the torque-producing current becomes incorrect by means of the integrating measurement value acquisition device, causing the torque regulation of the asynchronous machine to become incorrect.

SUMMARY OF THE INVENTION

The present provides a method and apparatus correction of this actual value of a measurement variable affected by harmonics, which value is affected by errors and determined by means of an integrating measurement value acquisition device. This allows an error-free actual value to be made available for further processing.

According to the invention, a harmonic signal is determined from a setting signal affected by harmonics, using the harmonic-free setting signal. The determined harmonic signal is provided to an equivalent model of the control system, and the mean value of the model signal is continuously determined during the gate time intervals of the first integrating actual value acquisition device, by means of a second integrating actual value acquisition device. The actual value affected by errors is corrected by means of the correction value made available at the end of each gate time interval.

Since the error of the actual value that is determined is the result of harmonics whose mean values are not equal to zero, a harmonic signal proportional to these harmonics is first determined. This harmonic signal is converted into a model signal by means of a model of the control system, for example of an inductance, which model signal is proportional to the harmonics of the signal affected by harmonics. Both signals are now passed to an integrating actual value acquisition device in each case, which continuously determines a mean value, within the gate time of the first integrating actual value acquisition device, where the mean values generated from the model signal are used as correction values to correct the actual value affected by errors.

In a preferred method, the consecutive gate time intervals are equally broad and are synchronized to the phase position of the harmonic-free sine-shaped setting signal. In this way, the mean value of the harmonic signal can be predetermined and stored in memory for each gate time interval, as a function of the pulse pattern. For the advance calculation of the mean values of the model signal, a standardized inductance and a frequency are used as the basis for the equivalent model of the control system. Each correction value for correction of the actual value affected by errors then results from the mean value stored in memory, which is weighted with the reciprocal value of the ratio of the present inductance value of the actual control system and the standardized inductance used as the basis in the advance calculation, and with the reciprocal value of the frequency ratio.

In another preferred method, if there is sufficient computer capacity, the harmonic signal and its mean value are calculated on-line, from the pulse sequence used, and the calculated mean value is deducted from the actual value that is determined for the signal affected by harmonics, as a correction value. In this connection, synchronization of the gate time intervals with the setting signal affected by harmonics is not required, and the gate time intervals can be selected as desired.

With the method, the error caused by harmonics excited by a known pulse pattern is corrected during the actual value determination of a signal affected by harmonics by means of an integrating actual value acquisition device, so that this corrected actual value can be passed, for example, to a current regulation, a flux model or a coordinate transformation circuit, for determination of actual values that form torque and flux.

In a circuit arrangement according to the invention, for implementation of the method, with a modulator with a subsequent converter-powered asynchronous machine as the control system and a first integrating actual value acquisition device, the harmonic-free setting signal which is present at the input of the modulator and the setting signal affected by harmonics, which is present at the output of the modulator, are passed to a comparator, the output of which is connected, via an equivalent model, with a second integrating actual value acquisition device, the output of which is linked with a comparator, the first input of which is connected with the output of the first integrating actual value acquisition device.

By means of this circuit arrangement, a harmonic signal is obtained from the signal affected by harmonics, from which correction values (mean values of the model signal present at the output of the equivalent model) can be continuously determined from the control system and a second integrating actual value acquisition device, by means of an equivalent model. These correction values are deducted from the actual values of the signal affected by harmonics that are determined, which are present at the output of the first integrating actual value acquisition device at the end of each gate time interval, by means of a comparator. In this way, a corrected actual value of a measured control variable affected by harmonics is obtained for further processing.

In a further circuit arrangement for implementation of a method variation with a modulator containing a memory, with a subsequent converter-powered asynchronous machine as the control system and a first integrating actual value acquisition device, an output of the memory is linked with a second adjustable constant element by means of a first adjustable constant element, where the output of the second adjustable constant element is connected with a comparator, the first input of which is linked with the output of the integrating actual value acquisition device.

Since the modulation function which excites the harmonics is known, the mean value of the harmonic signal can be determined in advance and stored in memory in each case. In the advance calculation of the mean values, a standardized equivalent model for the control system and a standard frequency are used as the basis. These stored mean values are weighted, using the two constant elements, so that correction values are passed to the comparator in serial manner. The first constant element indicates a ratio of the present equivalent model of the control system (converter-powered asynchronous machine) and the standardized equivalent model on which the advance calculation is based. The second constant element takes into consideration the different frequencies to the standard frequency in the advance calculation. Therefore the second constant element indicates the reciprocal value of the frequency ratio. In this circuit arrangement, all that is needed in addition to the existing circuit parts is two adjustable constant elements for correction of an actual value affected by errors that has been determined, and a comparator, which makes the structure of this circuit arrangement particularly simple and inexpensive.

For a further explanation of the invention, reference is made to the drawing, in which embodiments of the circuit arrangement for implementation of the method according to the invention for correction of an actual value determined by an integrating actual value acquisition device, which value is affected by errors, are illustrated.

DETAILED DESCRIPTION

Figure 1:
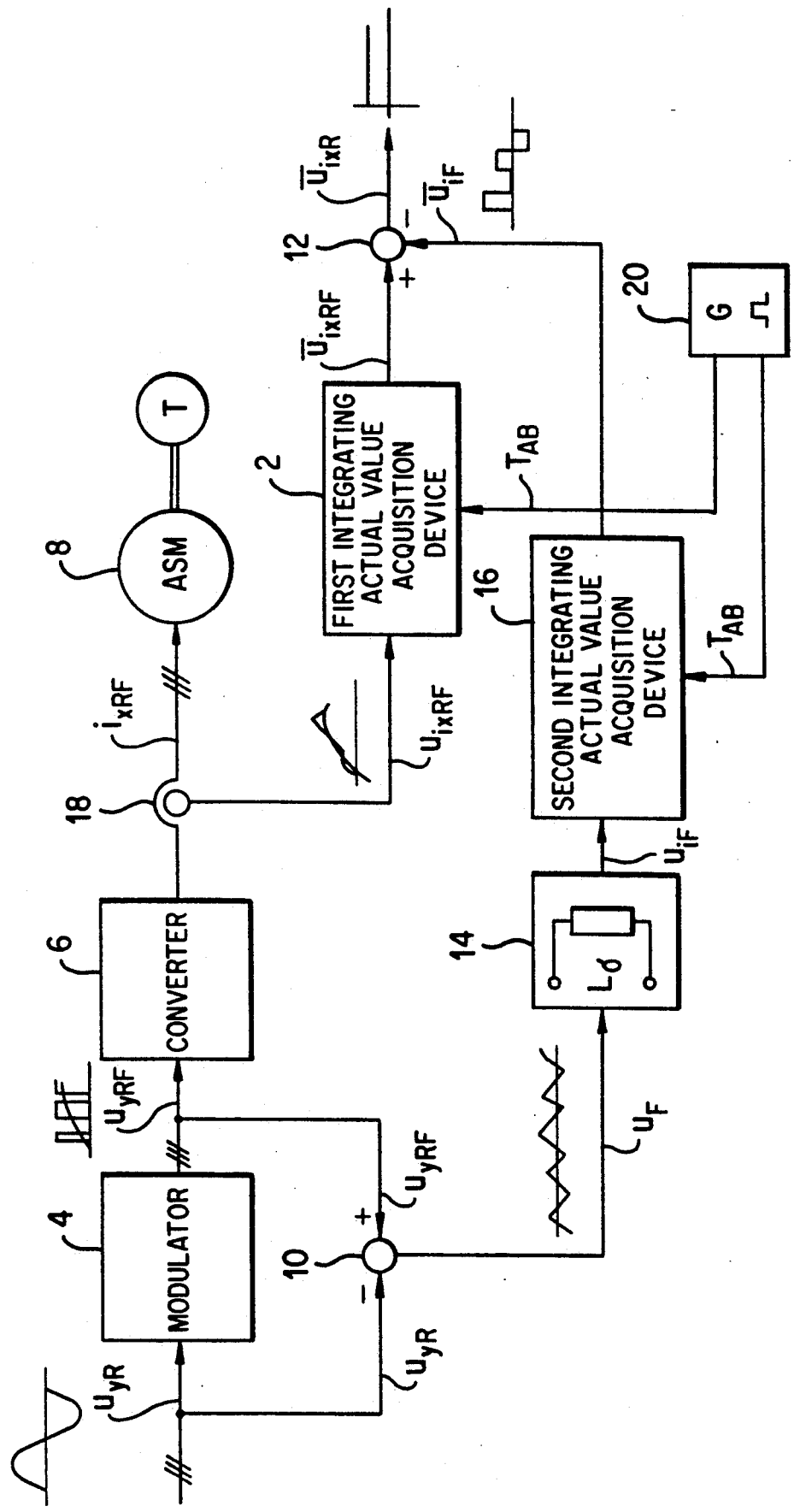
FIG. 1 shows a block schematic of a circuit arrangement for implementation of the method according to the present invention.
Figure 2:
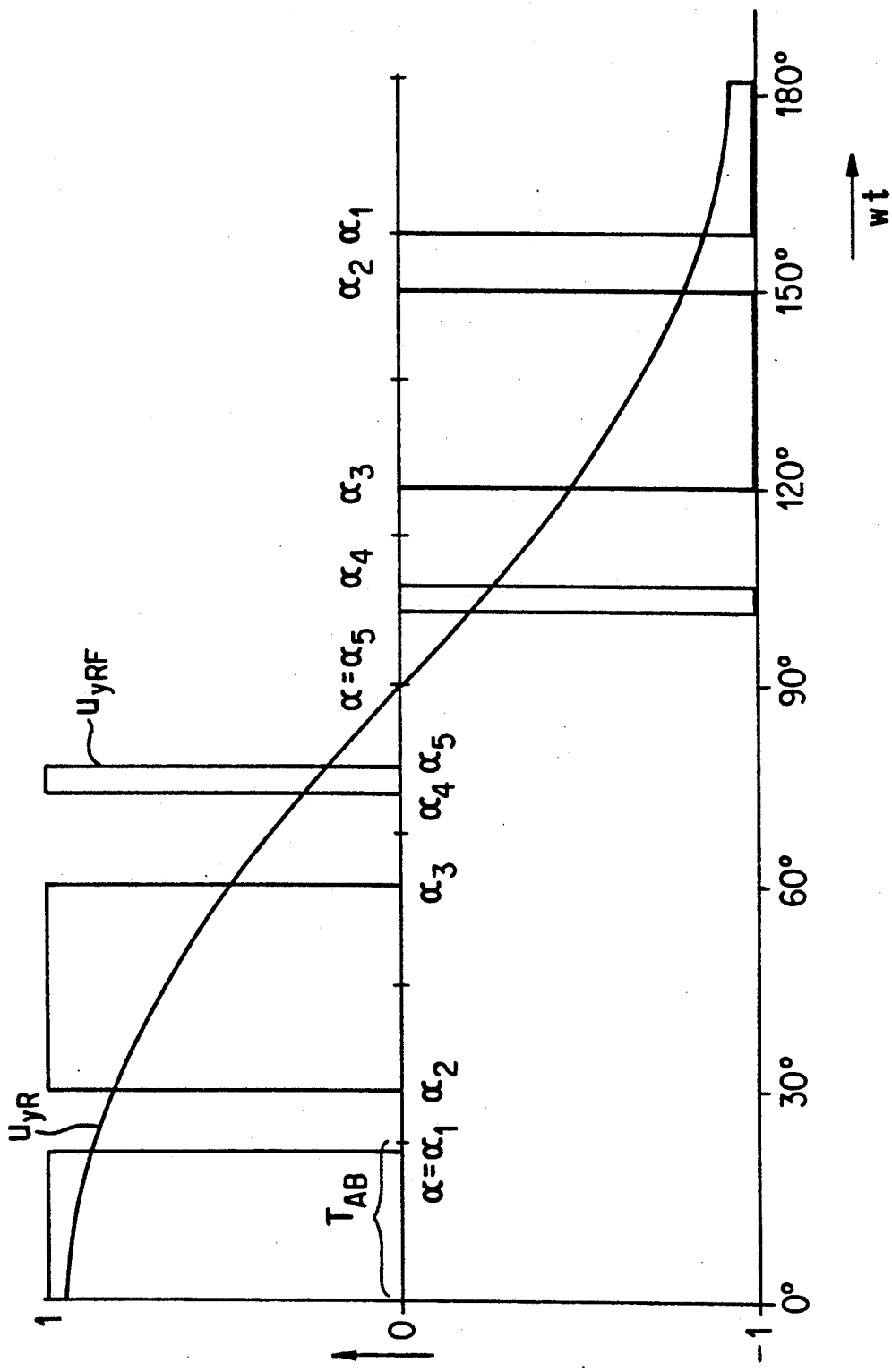
FIG. 2 represents a pulse-width-modulated-signal with five control angles $\alpha_1$ to $\alpha_5$ per quarter period in a diagram over the angle of rotation $\omega t$.

FIG. 1 represents a block schematic of a circuit arrangement for implementation of the method according to the invention, for correction of an actual value $\bar{u}_{ixRF}$ affected by errors, which is determined by means of a first integrating actual value acquisition device. This circuit arrangement consists of a modulator 4, a control system, including of a converter 6 and an asynchronous machine 8, two comparators 10 and 12, an equivalent model 14 of the control system, a first and second actual value acquisition device 2 and 16, and a pulse generator 20 for the gate time of the first and second actual value acquisition device 2 and 16. As the converter-powered control system, a line power converter can also be used; it is described in more detail in the journal Siemens Forsch.- und Entwickl.-Ber., Volume 16, 1987, No. 2, pages 55 to 59. A harmonic-free setting signal $u_{yR}$ is passed to the modulator 4 on the input side, which signal is converted to a pulse-width-modulated setting signal $u_{yRF}$ by means of a pulse pattern $\alpha_1, ..., \alpha_5$. This setting signal $u_{yRF}$, which is affected by harmonics, shown in greater detail in FIG. 2, in a diagram above the angle of rotation $\omega t$, controls the converter 6 which powers the asynchronous machine 8. As the result of the pulse-width-modulated converter output voltage, a signal $i_{xRF}$ is provided which is affected by harmonics (also called the control signal or control variable). This control signal $i_{xRF}$ which is affected by harmonics is acquired by means of a measurement transducer 18 and converted into a digital actual value $\bar{u}_{ixRF}$ using the first actual value acquisition device 2. Since the control signal $i_{xRF}$ is affected by harmonics, the measurement value $u_{ixRF}$ of the first actual value acquisition device is also affected by harmonics, which means that only an actual value $\bar{u}_{ixRF}$ affected by errors can be determined, because the mean value is not equal to zero Within the gate time interval $T_{AB}$.

The harmonics are excited by the modulation process, i.e. by the pulse pattern $\alpha_1, ..., \alpha_5$ stored in memory. In a pulse width modulated signal $u_{yRF}$, shown in greater detail in FIG. 2, in a diagram above the angle of rotation $\omega t$, five control times $\alpha_1, ..., \alpha_5$ are established for every quarter period, which are stored in a memory of the modulator 4. The memory contains several sets of control times $\alpha_1, ..., \alpha_5$, one set for every amplitude of the setting signal $U_{yR}$ that can be realized. The number of sets depends on the resolution of the invertor control ratio. Since the converter 6 powers a three-phase asynchronous machine 8, a three-phase signal system $u_{yR}$, $u_{yS}$ and $u_{yT}$ is preset as a setting voltage system, of which only the signal $u_{yR}$ will be considered here. The signal system $u_{yR}$, $u_{yS}$ and $u_{yT}$ can be determined by a reference value transducer or by a control and regulation device. In the simplest case, a comparator can be provided for each phase, which are controlled as a function of the control times $\alpha_1, ..., \alpha_5$ stored in memory in each case. These control times $\alpha_1, ..., \alpha_5$ are read out from a memory arranged in the modulator 4, by means of amplitude values and phase positions of the setting voltages $u_{yR}$, $u_{yS}$ and $u_{yT}$ which are present at the modulator 4. Precalculated, optimized pulse patterns are known, for example from the journal etz-A, Volume 94, 1973, Issue 5, pages 299 to 301. The application of precalculated, optimized pulse patterns for pulse-widthmodulated converters with an intermediate voltage circuit to power three-phase asynchronous machines is also well-known. By the use of precalculated pulse patterns, a control signal $i_{xRF}$ affected by harmonics is formed, which is converted into an actual value $\bar{u}_{ixRF}$ affected by errors, when a first integrating actual value acquisition device 2 is used.

In order to eliminate the error caused by the harmonics, the harmonic signal $u_F$ which causes the harmonics must first be determined. For this purpose, the harmonic-free setting signal $u_{yR}$ is passed to the comparator 10 at the inverting input, and the setting signal $u_{yRF}$ affected by harmonics, generated by the modulator 4, is passed to the non-inverting input. At its output, the harmonic signal $u_F$ is then present. This harmonic signal $u_F$ is converted into a model signal $u_{iF}$ by means of the equivalent model 14 of the control system 6, 8, which model signal corresponds to the superimposed harmonic signal of the control signal $i_{xRF}$. As an equivalent model 14 for the control system 6, 8, consisting of a converter-powered asynchronous machine 8, an inductance is provided in the simplest case. The value of the inductance corresponds to the leakage inductance $L_\sigma$ of the asynchronous machine 8. The model signal $u_{iF}$ is then passed to the second actual value acquisition device 16, which determines mean values $\bar{u}_{iF}$ in response thereto. In this connection, each mean value $\bar{u}_{iF}$ is always determined within a gate time interval $T_{AB}$ of the first actual value acquisition device 2. At the end of each gate time interval $T_{AB}$, a digital value is present, which counts as a measure of the error. These continuously determined correction values $\bar{u}_{iF}$ are passed to the inverting input of the comparator 12. At the non-inverting input of this comparator 12, the actual values $\bar{u}_{ixRF}$ of the continuous gate time intervals $T_{AB}$, which are affected by errors, are present. At the output, a corrected actual value $\bar{u}_{ixR}$ is then present, which can be processed further, for example in a current regulation, a flux model or a coordinate transformation circuit for determination of current components which form torque and flux.

In this circuit arrangement, the gate time intervals do not all have to have the same width, and also do not have to be synchronized to the phase position of the fundamental of the setting signal $u_{yRF}$ which is affected by harmonics.

Figure 3:
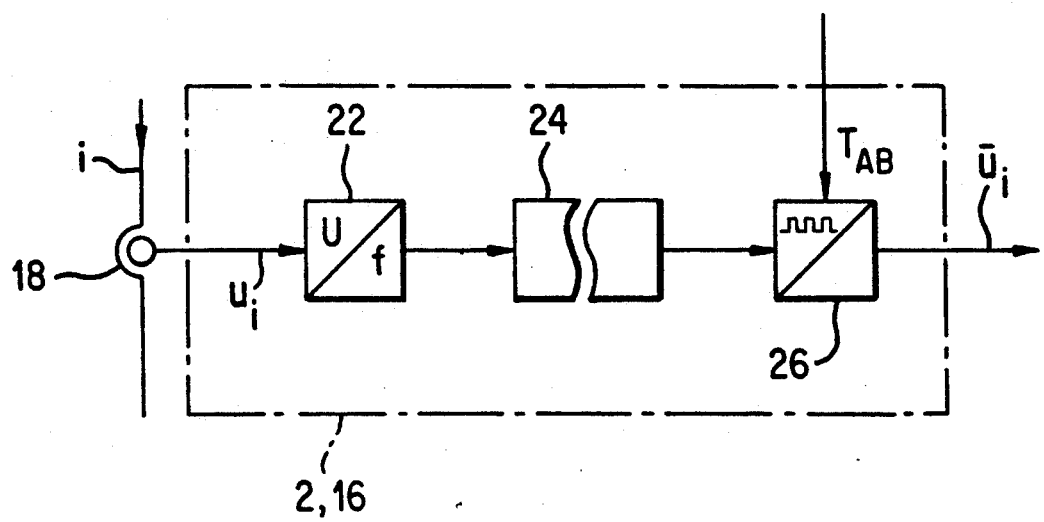
FIG. 3 shows a block schematic of a known integrating actual value acquisition device.

FIG. 3 shows a typical structure of the integrating actual value acquisition device 2 or 16 in greater detail. The actual value acquisition device 2 or 16 contains a voltage-frequency transformer 22, an transmission segment 24 with or without potential isolation, and an evaluation circuit 26. From a measurement signal $u_i$, the voltage-frequency transformer 22 generates an impulse train with a frequency proportional to the measurement signal $u_i$. The evaluation circuit 26 counts the incoming impulses of the impulse train within a gate time interval $T_{AB}$. The number of impulses determined is proportional to the integral (mean value) of the measurement variable $u_i$ and appears as a digital actual value $u_i$ set in a ratio to the gate time $T_{AB}$, at the output of the evaluation circuit 26. During these gate time intervals $T_{AB}$, pursuant to the circuit arrangement according to FIG. 1, correction values $\bar{u}_{iF}$ are determined from the harmonic signal $u_F$ that has been determined, and at the end of each gate time interval $T_{AB}$, they are subtracted from the actual value $\bar{u}_{ixRF}$ that has been determined, so that the error caused by the harmonics is eliminated again.

Figure 4:
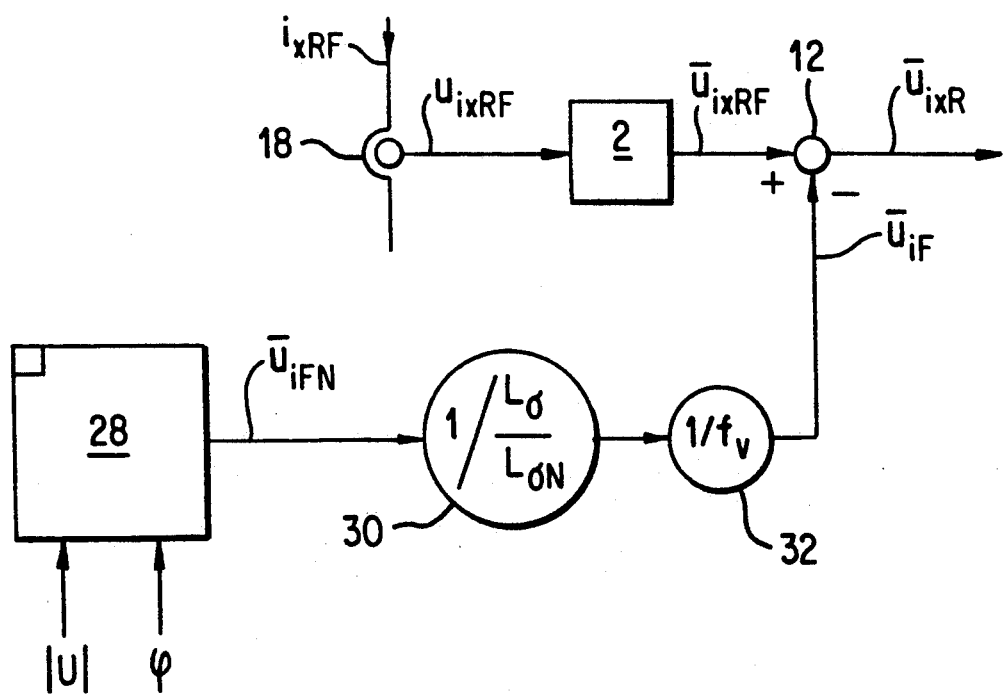
FIG. 4 illustrates a block schematic of an advantageous circuit arrangement for implementation of an advantageous method.

FIG. 4 shows a further circuit arrangement for implementation of a method variation for correction of the actual value $\bar{u}_{ixRF}$ which is affected by errors. Since the impulse patterns $a_1, ..., a_5$ which are used, and therefore the modulation function which the harmonics excite, and the equivalent model of the control system are known, the mean values for each gate time interval can be calculated in advance. For this purpose, however, the consecutive gate time intervals $T_{AB}$ have to be synchronized to the phase position of the fundamental oscillation of the setting signal $u_{yRF}$ which is affected by harmonics. These standardized mean values $\bar{u}_{iFN}$, which are calculated in advance from the pulse pattern, are stored in a memory 28. For calculation of the standardized mean values $\bar{u}_{iFN}$, an inductance value $L_{\sigma N}$ and a frequency corresponding to a predetermined speed of rotation have been used as the basis, as the equivalent model of the control system 6, 8. An output of the memory 28, at which a standardized mean value $\bar{u}_{iFN}$ is present as a function of an address $|U|$, $\phi$, is linked with a second adjustable constant element 32 via a first adjustable constant element 30, where the output of the adjustable constant element 32 is connected with the inverting input of the comparator 12.

The first adjustable constant element 30 is adjustable to a reciprocal value of the model ratio value $L_\sigma/L_{\sigma N}$, which indicates the ratio of the inductance value $L_\sigma$ to the inductance value $L_{\sigma N}$, which was used as the basis for the advance calculation of the mean value $\bar{u}_{iFN}$. The second adjustable constant element 32 is adjustable to a reciprocal value of the frequency ratio. Because of the advance calculation of the mean values $\bar{u}_{iFN}$ of the harmonics of the control signal $i_{xRF}$, the structure of this circuit arrangement is particularly simple and inexpensive, since the calculated values are stored in an existing memory, along with the pulse patterns.

If the computing power of the computer of a control and regulation circuit, not shown in greater detail, which calculates the harmonic-free setting signal $u_{yR}$ as a function of reference values and the calculated actual value $\bar{u}_{ixRF}$, is great enough, the mean value of the harmonics can be calculated on-line, from the pulse sequence used, and be deducted from the actual value affected by errors that has been determined, by means of a model ratio value and a reciprocal value, which actual value is then processed further in the control and regulation circuit, not shown, as the corrected actual value $\bar{u}_{ixRF}$ of the control signal $i_{xRF}$. The determination of the actual value $\bar{u}_{ixRF}$ from the control signal $i_{xRF}$ can also be taken over by means of the computer which contains the control and regulation circuit.

What is claimed is:

1. A method for correction of an actual value ($\bar{u}_{ixRF}$) determined by an integrating actual value acquisition device, the actual value being affected by errors, of a signal ($i_{xRF}$) affected by harmonics, wherein the signal ($i_{xRF}$) affected by harmonics is generated from a setting signal ($U_{yRF}$) which is generated by a predetermined modulation function which approximates a harmonic-free setting signal ($u_{yR}$), and a control system, the method comprising the steps of:

a) extracting a harmonic signal ($u_F$) from the setting signal ($u_{yR}$) affected by harmonics in response to the harmonic-free setting signal ($u_{yR}$);

b) applying the extracted harmonic signal ($u_F$) to an equivalent model of the control system and providing a model signal ($u_{iF}$) in response thereto;

c) continuously determining the mean value of the model signal ($u_{iF}$) during gate time intervals ($T_{AB}$) of the first integrating actual value acquisition device to provide correction values ($\bar{u}_{iF}$); and correcting the actual value ($\bar{u}_{ixRF}$) affected by errors in response to the correction values ($\bar{u}_{iF}$) made available in said determining step at the ends of each gate time interval ($T_{AB}$).

2. A method according to claim 1, wherein the harmonic signal ($u_F$) is generated from the difference of the setting signal ($u_{yRF}$) affected by harmonics and the harmonic-free setting signal ($u_{yR}$).

3. A method according to claim 1, wherein the consecutive gate time intervals ($T_{AB}$) are synchronized to the phase position of the setting signal ($u_{yRF}$) affected by harmonics.

4. A method according to claim 3, wherein the gate time intervals ($T_{AB}$) are equally broad.

5. A method according to claim 1, wherein for each gate time interval ($T_{AB}$), a standardized mean value of a standardized model signal is determined in advance and stored in memory, as a function of the predetermined modulation function.

6. A method according to claim 5, wherein each standardized mean value stored in memory is weighted with a reciprocal value of a model ratio value ($L_\sigma/L_{\sigma N}$) and a reciprocal value ($1/f_v$) of a frequency ratio and used as a correction value ($\bar{u}_{iF}$) to correct the actual value ($\bar{u}_{ixRF}$).

7. A method according to claim 3, wherein for each gate time interval ($T_{AB}$), a standardized mean value of a standardized model signal is determined in advance and stored in memory, as a function of the predetermined modulation function.

8. A method according to claim 7, wherein each standardized mean value stored in memory is weighted with a reciprocal value of a model ratio value ($L_\sigma/L_{\sigma N}$) and a reciprocal value ($1/f_v$) of a frequency ratio and used as a correction value ($\bar{u}_{iF}$) to correct the actual value ($\bar{u}_{ixRF}$).

9. A method according to claim 4, wherein for each gate time interval ($T_{AB}$), a standardized mean value of a standardized model signal is determined in advance and stored in memory, as a function of the predetermined modulation function.

10. A method according to claim 9, wherein each standardized mean value stored in memory is weighted with a reciprocal value of a model radio value ($L_\sigma/L_{\sigma N}$) and a reciprocal value ($1/f_v$) of a frequency ratio and used as a correction value ($\bar{u}_{iF}$) to correct the actual value ($\bar{u}_{ixRF}$).

11. An apparatus for correcting an actual value ($\bar{u}_{ixRF}$), wherein a harmonic-free setting signal ($u_{yR}$) is modulated by a predetermined modulation function to produce a setting signal ($u_{yRF}$) affected by harmonics, the setting signal ($u_{yRF}$) affected by harmonics being converted in a control system to a control signal ($i_{xRF}$) affected by harmonics, the actual value ($\bar{u}_{ixRF}$) being determined by a first integrating actual value acquisition device in response to the control signal ($i_{xRF}$) affected by harmonics such that the actual value ($\bar{u}_{ixRF}$) is affected by errors of the control signal ($i_{xRF}$) affected by harmonics, the apparatus comprising:

a comparator which compares said harmonic-free setting signal ($u_{yR}$) and said setting signal ($u_{yRF}$) affected by harmonics to produce a harmonic signal ($u_F$);

an equivalent model of the control system which converts said harmonic signal ($u_F$) produced by said comparator to a model signal ($u_{iF}$) corresponding to a superimposed harmonic signal of the control signal ($i_{xRF}$) affected by harmonics;

a second integrating actual value acquisition device which determines mean values ($\bar{u}_{iF}$) in response to said model signal ($u_{iF}$) provided by said equivalent model of the control system during gate time intervals ($T_{AB}$) of the first integrating actual value acquisition device; and means for correcting said actual value ($\bar{u}_{ixRF}$) in response to said mean values ($\bar{u}_{iF}$) determined by said second integrating actual value acquisition device and producing as a result a corrected actual value ($\bar{u}_{ixR}$).

12. An apparatus according to claim 11, wherein an inductance is provided as the equivalent model of the control system.

13. An apparatus according to claim 12, wherein said inductance corresponds to a leakage inductance ($L_\sigma$) of an asynchronous machine included in said control system.

14. An apparatus for correcting an actual value ($\bar{u}_{ixRF}$), wherein a harmonic-free setting signal ($u_{yR}$) is modulated by a predetermined modulation function to produce a setting signal ($u_{yRF}$) affected by harmonics, the setting signal ($u_{yRF}$) affected by harmonics being converted in a control system to a control signal ($i_{xRF}$) affected by harmonics, the actual value ($\bar{u}_{ixRF}$) being determined by a first integrating actual value acquisition device in response to the control signal ($i_{xRF}$) affected by harmonics such that the actual value ($\bar{u}_{ixRF}$) is affected by errors of the control signal ($i_{xRF}$) affected by harmonics, the apparatus comprising:

a memory which stores standardized mean values of a standardized model signal for each gate time interval ($T_{AB}$) of the first integrating actual value acquisition device as a function of the predetermined modulation function; and means for correcting said actual value ($\bar{u}_{ixRF}$) in response to said standardized mean values stored by said memory and producing as a result a corrected actual value ($\bar{u}_{ixR}$).

15. An apparatus according to claim 14, further comprising an adjustable constant element which adjusts the standardized mean values store by said memory by weighting said stored standardized mean values by an adjustable constant element, wherein said means for correcting corrects the actual value ($\bar{u}_{ixRF}$) in response to the standardized values adjusted by said adjustable constant element.

* * * * *